United States Patent
Bodtker et al.

(10) Patent No.: US 10,239,552 B2
(45) Date of Patent: Mar. 26, 2019

(54) ROTATION CONTROL ASSEMBLY FOR A STEERING COLUMN

(71) Applicant: STEERING SOLUTIONS IP HOLDING CORPORATION, Saginaw, MI (US)

(72) Inventors: Joen C. Bodtker, Gaines, MI (US); Melvin Lee Tinnin, Clio, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 127 days.

(21) Appl. No.: 15/293,900

(22) Filed: Oct. 14, 2016

(65) Prior Publication Data

US 2018/0105198 A1 Apr. 19, 2018

(51) Int. Cl.
*B62D 5/00* (2006.01)
*B62D 1/16* (2006.01)
*B60R 21/203* (2006.01)

(52) U.S. Cl.
CPC .......... *B62D 5/005* (2013.01); *B62D 1/16* (2013.01); *B60R 21/203* (2013.01)

(58) Field of Classification Search
CPC .......... B62D 5/005; B62D 1/16; B60R 21/203
See application file for complete search history.

(56) References Cited

U.S. PATENT DOCUMENTS

| | | |
|---|---|---|
| 3,420,586 A * | 1/1969 | Gerner ............... B62D 1/16 384/218 |
| 4,315,117 A | 2/1982 | Kokubo et al. |
| 4,337,967 A | 7/1982 | Yoshida et al. |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

Gillespie, Thomas D.; "Fundamentals of Vehicle Dynamics"; Society of Automotive Enginers, Inc.; published 1992; 294 pages.

(Continued)

*Primary Examiner* — Faye M Fleming
(74) *Attorney, Agent, or Firm* — Cantor Colburn LLP (57) ABSTRACT

A rotation control assembly for a steering column assembly includes a steering shaft. Also included is a driving tab rotatable with the steering shaft. Further included is a rotating plate surrounding the steering shaft and rotatable relative to the steering shaft, the rotating plate having a driven tab extending from the rotating plate, the driving tab engageable with the driven tab to rotate the rotating plate. Yet further included is an end stop extending from a structure disposed radially outward of the steering shaft and radially positioned to engage the driven tab upon rotation of the driven tab to the end stop, engagement of the driven tab and the end stop limiting rotation of the steering shaft.

20 Claims, 6 Drawing Sheets

(56) References Cited

U.S. PATENT DOCUMENTS

| | | |
|---|---|---|
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 7,018,299 B2 | 3/2006 | da Silva |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,725,098 B2 | 8/2017 | Abou-Nasr et al. |
| 9,810,727 B2 | 11/2017 | Kandler et al. |
| 9,852,752 B1 | 12/2017 | Chou et al. |
| 9,868,449 B1 | 1/2018 | Holz et al. |
| 9,878,732 B2 * | 1/2018 | Urushibata .............. B62D 1/16 |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |

(56) References Cited

U.S. PATENT DOCUMENTS

| | | |
|---|---|---|
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 2/2015 | Hahne |
| 2015/0210273 A1 | 2/2015 | Kaufmann et al. |
| 2015/0060185 A1 | 3/2015 | Feguri |
| 2015/0120141 A1 | 4/2015 | Lavoie et al. |
| 2015/0120142 A1 | 4/2015 | Park et al. |
| 2015/0123947 A1 | 5/2015 | Jubner et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0338849 A1 | 11/2015 | Nemec et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113712 A1 | 4/2017 | Watz |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0225704 A1 | 8/2017 | Urushibata |
| 2017/0240204 A1 | 8/2017 | Raad et al. |
| 2017/0293306 A1 | 10/2017 | Riefe et al. |
| 2017/0297606 A1 | 10/2017 | Kim et al. |
| 2017/0305458 A1 | 10/2017 | Wang et al. |
| 2017/0356487 A1* | 12/2017 | Muntener ............... B62D 1/16 |
| 2018/0029632 A1 | 2/2018 | Bodtker et al. |
| 2018/0072341 A1 | 3/2018 | Schulz et al. |
| 2018/0093700 A1 | 4/2018 | Chandy |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A | 1/2012 |
| CN | 102452391 A | 5/2012 |
| CN | 202563346 U | 11/2012 |
| CN | 103158699 A | 6/2013 |
| CN | 103419840 A2 | 12/2013 |
| CN | 103448785 A | 12/2013 |
| CN | 104024084 A | 9/2014 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| DE | 102015212857 A1 * | 1/2016 ............... B62D 1/16 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H05162652 A | 6/1993 |
| JP | 2007253809 A | 10/2007 |
| JP | 20174099 A | 1/2017 |
| KR | 20100063433 A | 6/2010 |
| WO | 2006099483 A1 | 9/2006 |
| WO | WO-2008120231 A2 * | 10/2008 ............... B62D 1/16 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.

Van Der Jagt, Pim; "Prediction of steering efforts during stationary or slow rolling parking maneuvers"; Jul. 2013, 20 pages.

(56) References Cited

OTHER PUBLICATIONS

Varunjikar, Tejas; Design of Horizontal Curves With DownGrades Using Low-Order Vehicle Dynamics Models; A Theisis by T. Varunkikar; 2011; 141 pages.
CN Patent Application No. 201610575225.9 First Office Action dated Jan. 22, 2018, 10 pages.
English Translation of Chinese Office Action and Search Report for Chinese Application No. 2016103666609.X dated Dec. 20, 2017, 8 pages.

\* cited by examiner

ROTATION CONTROL ASSEMBLY FOR A STEERING COLUMN

BACKGROUND

The embodiments disclosed herein relate to steering column assemblies and, more particularly, to a rotation control assembly for steering column assemblies.

Steer-by-wire steering columns may not have a mechanical connection to a steering gear. The mechanical connection may be replaced by an artificial road feel device, typically a servo motor controlled to provide road force feedback to the driver. It can also provide enough force to indicate the end of wheel travel or lock-to-lock end stops. When the vehicle is powered down it may be desired to not draw battery power to provide the static steer efforts. In this situation, the steering wheel is easy to rotate. It may be possible to rotate the wheel beyond the wiring limits of a supplemental inflatable restraint (SIR) coil, thus severing the wire and making the vehicle non-functional or unsafe to drive.

SUMMARY OF THE INVENTION

In one embodiment of the disclosure, a rotation control assembly for a steering column assembly includes a steering shaft. Also included is a driving tab rotatable with the steering shaft. Further included is a rotating plate surrounding the steering shaft and rotatable relative to the steering shaft, the rotating plate having a driven tab extending from the rotating plate, the driving tab engageable with the driven tab to rotate the rotating plate. Yet further included is an end stop extending from a structure disposed radially outward of the steering shaft and radially positioned to engage the driven tab upon rotation of the driven tab to the end stop, engagement of the driven tab and the end stop limiting rotation of the steering shaft.

In another embodiment of the disclosure, a rotation control assembly for a steering column assembly includes a steering shaft. Also included is a fixed plate fixedly coupled to the steering shaft to rotate with the steering shaft, the fixed plate having a fixed plate pin extending therefrom. Further included is a plurality of rotating plates surrounding the steering shaft and rotatable relative to the steering shaft, each of the rotating plates having a rotating plate pin extending from the rotating plate, one of the rotating plate pins engageable with the fixed plate pin to rotate the rotating plates. Yet further included is an end stop extending from a structure disposed radially outward of the steering shaft and radially positioned to engage one of the rotating plate pins upon rotation of the rotating plate pin to the end stop, engagement of the rotating plate pin and the end stop limiting rotation of the steering shaft.

In yet another embodiment of the disclosure, a rotation control assembly for a steering column assembly includes a steering shaft. Also included is a fixed plate surrounding the steering shaft and fixedly coupled thereto to rotate with the steering shaft, the fixed plate having a driving pin extending therefrom and having a first rotation axis coaxial with a rotation axis of the steering shaft. Further included is a driven wheel having a second rotation axis offset from and parallel to the first rotation axis, the driven wheel defining a plurality of slots extending radially inwardly, at least one of the slots extending to a shallower depth relative to the other slots, the driving pin engageable with the plurality of slots, engagement of the driving pin and the slot having a shallower depth limiting rotation of the steering shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where embodiments will be described, without limiting same, FIGS. 1-4 illustrate a steering column assembly generally referenced with numeral 10. The steering column assembly 10 may be employed on various types of vehicles. In some embodiments, the steering column assembly 10 is employed in an automobile and is a steering column that may be mechanically disconnected from a steering gear (not shown). For example, a steer-by-wire steering system may benefit from the embodiments described herein. In other embodiments, the steering column is part of a mechanical steering system having an I-shaft decoupling device.

In some situations, a steering wheel (not shown) operatively coupled to the steering column assembly 10 is easy to rotate. It may be possible to rotate the wheel beyond the wiring limits of a supplemental inflatable restraint (SIR) coil, thus severing the wire and making the vehicle non-functional or unsafe to drive. To address this issue, a rotation control assembly 12 is provided. The rotation control assembly 12 limits the angular rotation of the steering column assembly 10 by providing an end stop 14 that mechanically stops the angular travel of the steering column assembly 10.

The steering column assembly 10 includes a steering shaft 16 that rotates upon input from a user via rotation of the steering wheel. The steering shaft 16 is disposed radially inward of, and rotates within, a column jacket 18 that remains rotationally stationary, relative to the steering shaft 16. The end stop 14 that provides a hard stop for rotational travel of the steering shaft 16 is operatively coupled to, or integrally formed with, the column jacket 18 and extends radially inwardly therefrom. Alternatively, the end stop 14 may be operatively coupled to, or integrally formed with, a different steering column housing structure.

A fixed plate 20 surrounds at least a portion of the steering shaft 16 and is operatively coupled to, or integrally formed with, the steering shaft 16 in a manner that allows the fixed plate 20 to rotate with the steering shaft 16. In the illustrated embodiment, the fixed plate 20 is a cylindrical ring that extends completely around the steering shaft 16, but it is to be appreciated that alternative shapes may be utilized in some embodiments. Extending from the fixed plate 20 is a driving tab 22. In some embodiments, the driving tab 22 extends radially outward from a radially outer surface 24 of the fixed plate 20. Additionally, the driving tab 22 extends from the fixed plate 20 in an axial direction that facilitates engagement of the driving tab 22 with a tab of an adjacent plate, as described in detail below.

At least one rotating plate 26 surrounds the steering shaft 16, but is free to rotate relative to the steering shaft 16, unlike the fixed plate 20. As with the fixed plate 20, the rotating plate(s) 26 may be cylindrical rings that extend completely around the steering shaft 16, but it is to be appreciated that alternative shapes may be utilized in some embodiments. As shown in the illustrated embodiments, a plurality of rotating plates may be employed. In particular, the illustrated embodiments disclose four rotating plates, but the number of rotating plates may be modified to adjust the angular rotation limit of the steering shaft 16, as will be appreciated from the description herein. Regardless of the number of rotating plates 26, each rotating plate 26 includes a driven tab 28 extending therefrom. In some embodiments, the driven tab 28 extends radially outward from a radially outer surface 30 of the rotating plate 26. Additionally, the driven tab 28 extends from the rotating plate 26 in an axial direction that facilitates engagement of the driven tab 28 with a tab of an adjacent plate or the end stop 14.

As shown, a spacer plate 32 may be provided between adjacent rotating plates 26 and/or between a rotating plate 26 and the fixed plate 20. The spacer plate(s) 32 are cylindrical rings in the illustrated embodiment and surround the steering shaft 16. The spacer plate 32 is free to rotate relative to the steering shaft 16 and may be easily removed in an axial direction to allow adjustment of the number of rotating plates 26 included in the assembly. A shaft bearing 34 axially constrains the rotating plate(s) 26, the fixed plate 20 and the spacer plate(s) 32 and surrounds the steering shaft 16. It is to be appreciated that other axial retention components may be employed to axially constrain the rotating plate(s) 26, the fixed plate 20 and the spacer plate(s) 32.

In operation, the fixed plate 20 rotates in response to rotation of the steering shaft 16. This is due to engagement of the driving tab 22 with a keyway defined by the steering shaft 16 in some embodiments. In other embodiments, the fixed plate 20 is coupled to the steering shaft 16 in a manner that produces simultaneous rotation of the steering shaft 16 and the fixed plate 20, such as a welded securement or the like. Rotation of the fixed plate 20 results in rotation of the driving tab 22 until engagement with the driven tab 28 of an adjacent rotating plate 26 occurs. Further rotation results in rotation of the driving tab 22 and the driven tab 28 until engagement of the driven tab 28 engages an adjacent driven tab 28. This continues until a driven tab 28 of the rotating plate 26 located axially closest to the end stop 14 occurs. Engagement of the driven tab 28 closest to the end stop 14 results in a hard stop of angular movement by the steering shaft 16, thus avoiding undesirable consequences of over-rotation of the steering shaft 16.

Figure 1:
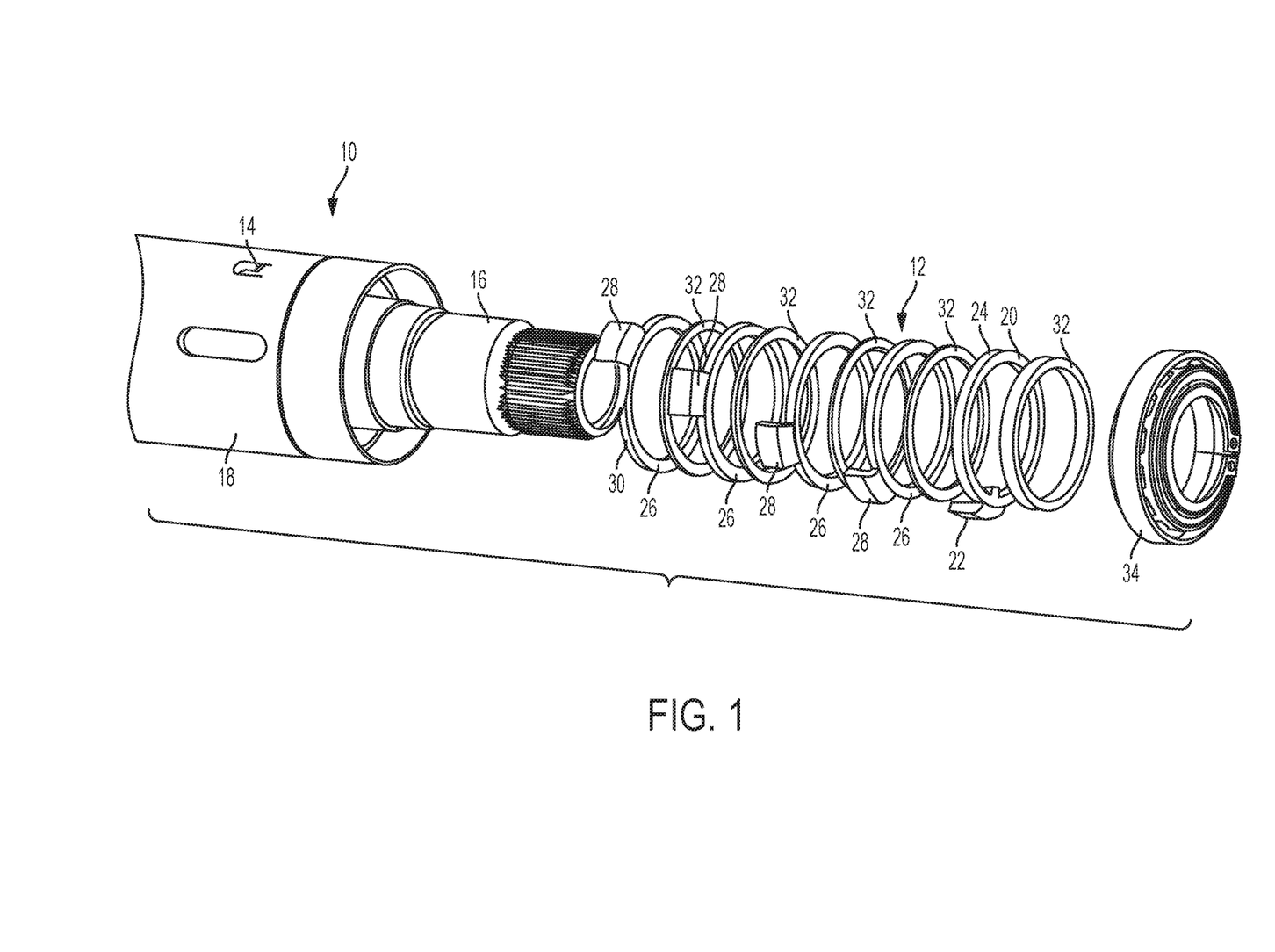
FIG. 1 is a perspective, partially disassembled view of a rotation control assembly for a steering column.
Figure 2:
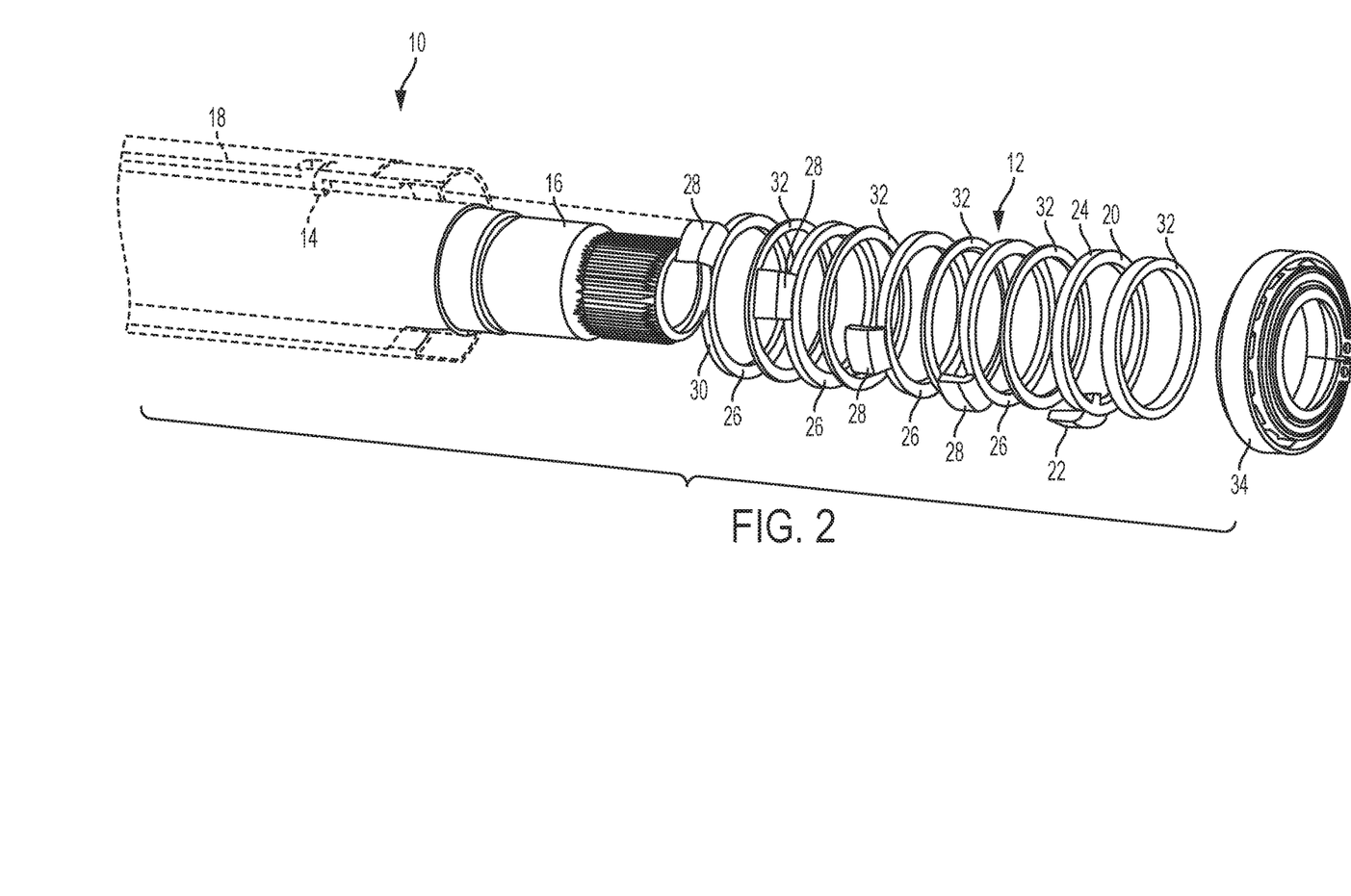
FIG. 2 is a perspective, cross-sectional, partially disassembled view of the rotation control assembly.
Figure 3:
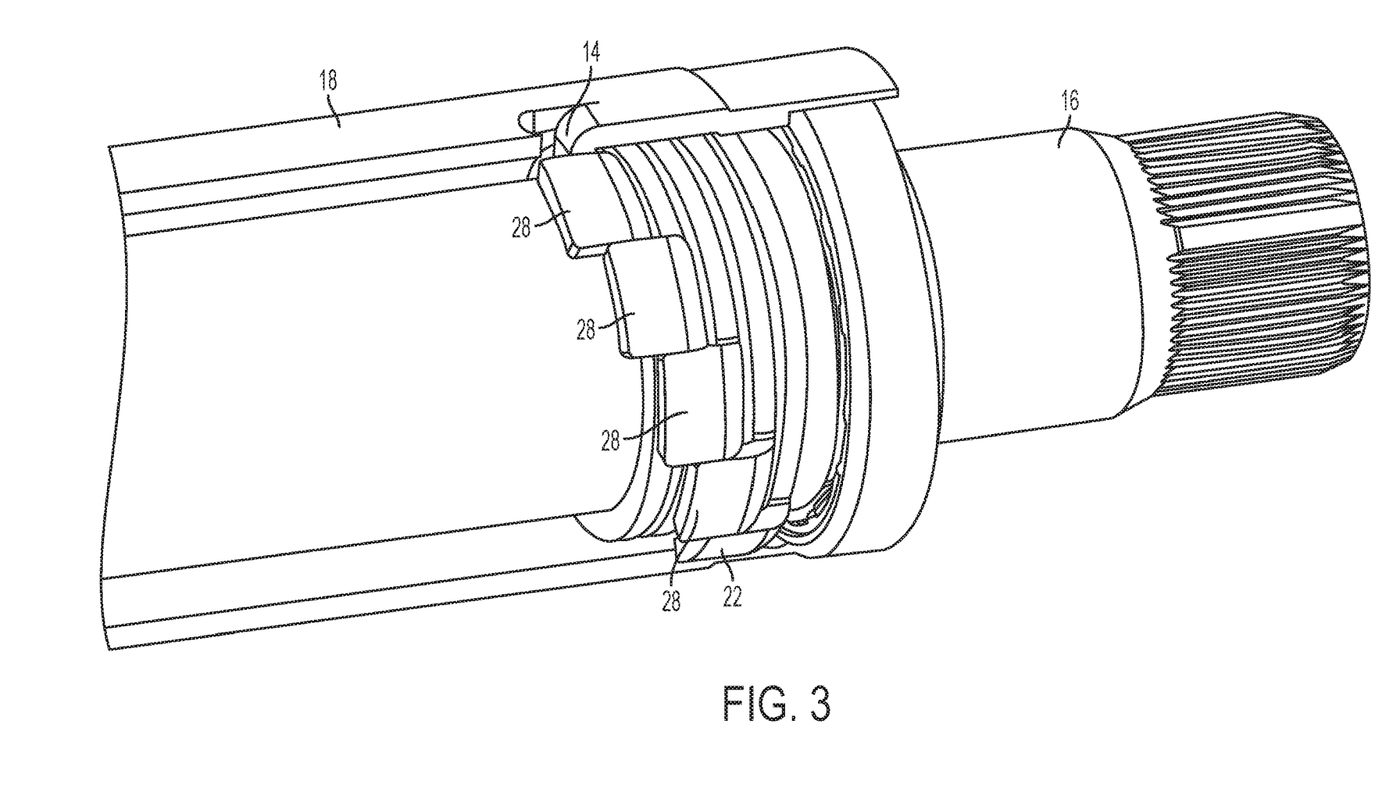
FIG. 3 is a perspective view of the rotation control assembly in a fully rotated position.
Figure 4:
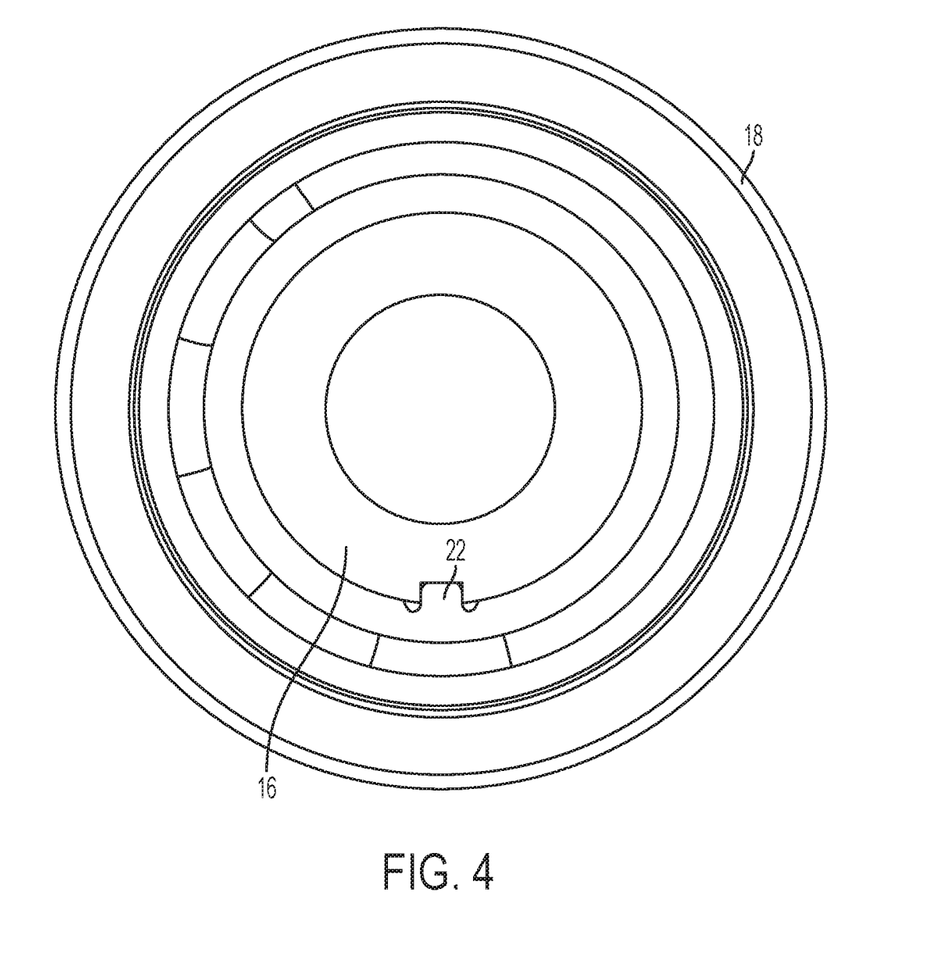
FIG. 4 is an end view of the rotation control assembly.
Figure 5:
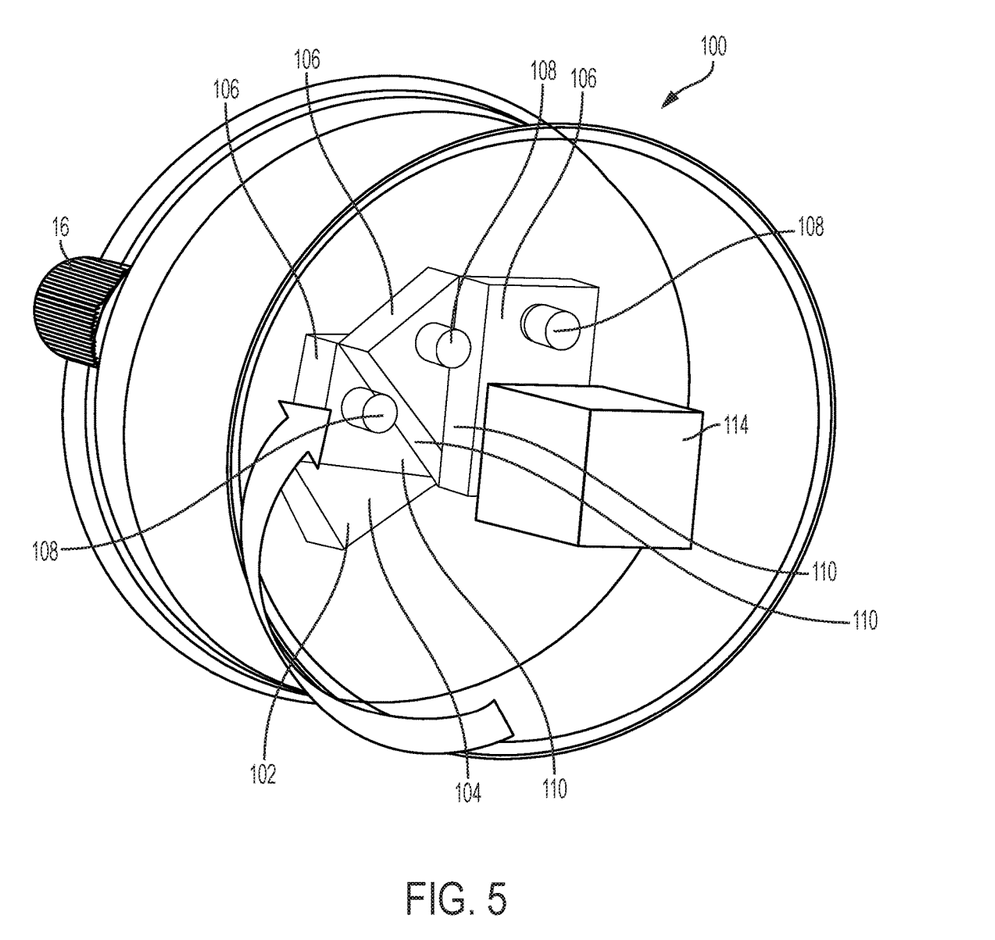
FIG. 5 is a perspective view of the rotation control assembly according to another aspect of the disclosure.

Referring now to FIG. 5, another embodiment of the rotation control assembly is illustrated and referenced with numeral 100. The rotation control assembly 100 includes a fixed plate 102 that is operatively coupled to, or integrally formed with, the steering shaft 16 in a manner that allows the fixed plate 102 to rotate with the steering shaft 16. A fixed plate pin 104 extending perpendicularly, or substantially perpendicularly, from the fixed plate 102 is provided. At least one rotating plate 106 surrounds the steering shaft 16, but is free to rotate relative to the steering shaft 16, unlike the fixed plate 102. As shown, a plurality of rotating plates 106 may be employed. As is the case with the embodiment of FIGS. 1-4, the number of rotating plates may be modified to adjust the angular rotation limit of the steering shaft 16. In each embodiment, the number of rotating plates determines the angular degree of rotational travel of the steering shaft 16. Each of the rotating plates 106 include a rotating plate pin 108 that extends perpendicularly, or substantially perpendicularly, from the rotating plate 106.

In operation, the fixed plate 102 rotates in response to rotation of the steering shaft 16. Rotation of the fixed plate 102 results in rotation of the fixed plate pin 104 until engagement with an engagement surface 110 of an adjacent rotating plate 106 occurs. Further rotation results in rotation of the fixed plate pin 104 and the rotating plate pin 108 until engagement of the rotating plate pin 108 engages an engagement surface 110 of an adjacent rotating plate 106. This continues until a rotating plate pin 108 of the rotating plate 106 located axially closest to the end stop 114 engages the end stop 114. Engagement of the rotating plate pin 108 closest to the end stop 114 results in a hard stop of angular movement by the steering shaft 16, thus avoiding undesirable consequences of over-rotation of the steering shaft 16.

Figure 6:
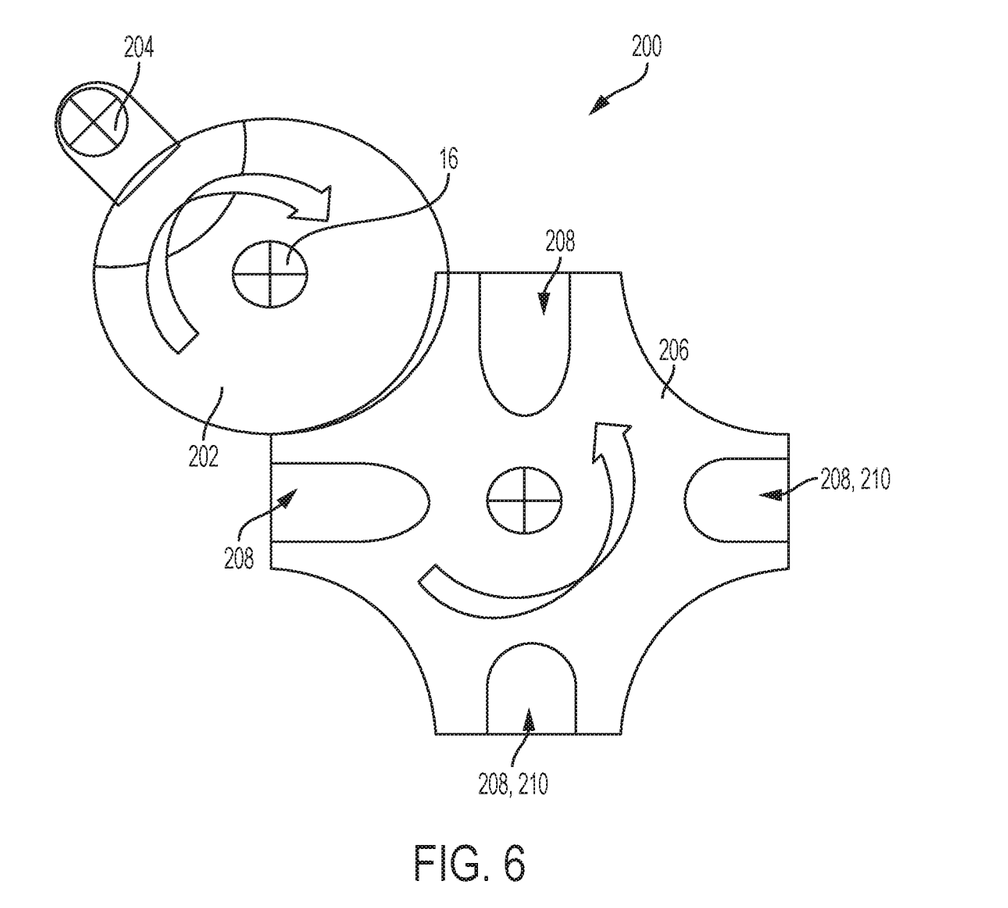
FIG. 6 is a schematic view of the rotation control assembly according to yet another aspect of the disclosure.

Referring now to FIG. 6, another embodiment of the rotation control assembly is illustrated and referenced with numeral 200. The rotation control assembly 200 includes a fixed plate 202 operatively coupled to, or integrally formed with, the steering shaft 16 in a manner that allows the fixed plate 202 to rotate with the steering shaft 16. A driving pin 204 extending perpendicularly, or substantially perpendicularly, from the fixed plate 202 is provided. A driven wheel 206 is disposed in proximity to the fixed plate 202 and rotates about an axis that is offset from, but parallel to, a rotation axis of the steering shaft 16 and the fixed plate 202. The driving pin 204 extends into one of a plurality of slots 208 of the driven wheel 206 to advance the driven wheel 206 by one step. This mechanism may be referred to as a Geneva gear that translates a continuous rotation of the steering shaft 16 and the fixed plate 202 into an intermittent rotary motion of the driven wheel 206. The fixed plate 202 may also have a raised blocking disc that locks the driven wheel 206 in position between steps.

In operation, as the steering shaft 16 rotates, the driving pin 204 engages one of the slots 208 of the driven wheel 206. As shown, some of the slots 208 extend radially deeper into the driven wheel 206 relative to other slots 208. The deeper slots allow continued rotation of the driven wheel 206 and consequently the fixed plate 202 and the steering shaft 16. The shallower slots do not allow continued rotation and are therefore considered end stops 210. The steering shaft 16 is free to reverse direction without binding or impulse locking.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A rotation control assembly for a steering column assembly comprising:
   a steering shaft;
   a driving tab rotatable with the steering shaft;

a rotating plate surrounding the steering shaft and rotatable relative to the steering shaft, the rotating plate having a driven tab extending from the rotating plate, the driving tab engageable with the driven tab to rotate the rotating plate; and an end stop extending from a structure disposed radially outward of the steering shaft and radially positioned to engage the driven tab upon rotation of the driven tab to the end stop, engagement of the driven tab and the end stop limiting rotation of the steering shaft.

2. The assembly of claim 1, wherein the steering column assembly comprises a steering column that is mechanically decoupled from a steering gear.

3. The assembly of claim 2, wherein the steering column assembly is a steer-by-wire assembly.

4. The assembly of claim 2, wherein the steering column assembly is a mechanical steering system having an I-shaft decoupling device.

5. The assembly of claim 1, further comprising a fixed plate surrounding the steering shaft and fixedly coupled thereto to rotate with the steering shaft, the driving tab integrally formed with the fixed plate and engaged with a keyway defined by the steering shaft to rotatably drive the driving tab during rotation of the steering shaft.

6. The assembly of claim 1, wherein the rotating plate is one of a plurality of rotating plates, each rotating plate surrounding the steering shaft and rotatable relative to the steering shaft, each rotating plate having a driven tab extending from the respective rotating plate, the driving tab engageable with one of the driven tabs to rotate the rotating plates.

7. The assembly of claim 6, further comprising at least one spacer plate surrounding the steering shaft, the at least one spacer plate disposed between the plurality of rotating plates.

8. The assembly of claim 6, wherein the angular rotation limit of the steering shaft is adjustable by modifying the number of the plurality of rotating plates.

9. The assembly of claim 6, wherein the angular rotation limit of the steering shaft is adjustable by modifying the width of the driven tabs.

10. The assembly of claim 5, further comprising a spacer plate disposed between the fixed plate and the rotating plate.

11. The assembly of claim 1, wherein the structure disposed radially outward of the steering shaft comprises a steering column jacket.

12. The assembly of claim 1, wherein the structure disposed radially outward of the steering shaft comprises a column housing.

13. A rotation control assembly for a steering column assembly comprising:

a steering shaft;

a fixed plate fixedly coupled to the steering shaft to rotate with the steering shaft, the fixed plate having a fixed plate pin extending therefrom;

a plurality of rotating plates surrounding the steering shaft and rotatable relative to the steering shaft, each of the rotating plates having a rotating plate pin extending from the rotating plate, at least one of the rotating plate pins engageable with the fixed plate pin to rotate the rotating plates; and an end stop extending from a structure disposed radially outward of the steering shaft and radially positioned to engage one of the rotating plate pins upon rotation of the rotating plate pin to the end stop, engagement of the rotating plate pin and the end stop limiting rotation of the steering shaft.

14. The assembly of claim 13, wherein the steering column assembly comprises a steering column that is mechanically decoupled from a steering gear.

15. The assembly of claim 14, wherein the steering column assembly is a steer-by-wire assembly.

16. The assembly of claim 13, wherein the angular rotation limit of the steering shaft is adjustable by modifying the number of the plurality of rotating plates.

17. The assembly of claim 13, wherein the structure disposed radially outward of the steering shaft comprises a steering column jacket.

18. The assembly of claim 13, wherein the structure disposed radially outward of the steering shaft comprises a column housing.

19. A rotation control assembly for a steering column assembly comprising:

a steering shaft;

a fixed plate surrounding the steering shaft and fixedly coupled thereto to rotate with the steering shaft, the fixed plate having a driving pin extending therefrom and having a first rotation axis coaxial with a rotation axis of the steering shaft; and a driven wheel having a second rotation axis offset from and parallel to the first rotation axis, the driven wheel defining a plurality of slots extending radially inwardly, at least one of the slots extending to a shallower depth relative to the other slots, the driving pin engageable with the plurality of slots, engagement of the driving pin and the slot having a shallower depth limiting rotation of the steering shaft.

20. The assembly of claim 19, wherein the steering column assembly is a steer-by-wire assembly.

* * * * *